(12) United States Patent
Wiles et al.

(10) Patent No.: US 8,192,780 B2
(45) Date of Patent: Jun. 5, 2012

(54) DAIRY PRODUCT AND PROCESS

(75) Inventors: Peter Wiles, Palmerston North (NZ);
Siew Kim Lee, Palmerston North (NZ);
Skelte Gerald Anema, Palmerston North (NZ); Palatasa Havea, Palmerston North (NZ)

(73) Assignee: Fonterra Co-Operative Group Limited, Auckland (NL)

( * ) Notice: Subject to any disclaimer, the term of this patent is extended or adjusted under 35 U.S.C. 154(b) by 483 days.

(21) Appl. No.: 12/294,038

(22) PCT Filed: Mar. 23, 2007

(86) PCT No.: PCT/NZ2007/000058
§ 371 (c)(1),
(2), (4) Date: Jun. 15, 2009

(87) PCT Pub. No.: WO2007/108708
PCT Pub. Date: Sep. 27, 2007

(65) Prior Publication Data
US 2010/0055287 A1    Mar. 4, 2010

(30) Foreign Application Priority Data

Mar. 23, 2006 (NZ) .................................. 546105
Apr. 11, 2006 (NZ) .................................. 546530

(51) Int. Cl.
*A23C 19/00* (2006.01)
*A23J 1/00* (2006.01)
*A23C 17/00* (2006.01)

(52) U.S. Cl. .................. 426/582; 426/583; 426/656

(58) Field of Classification Search .................. None
See application file for complete search history.

(56) References Cited

U.S. PATENT DOCUMENTS

| 4,885,183 | A | * | 12/1989 | Strandholm et al. ......... 426/582 |
| 6,261,624 | B1 | | 7/2001 | Hudson et al. |
| 6,497,915 | B2 | | 12/2002 | Pearce et al. |
| 6,767,575 | B1 | | 7/2004 | Huss et al. |

FOREIGN PATENT DOCUMENTS

| EP | 1 057 412 A2 | 12/2000 |
| EP | 1 020 120 B1 | 5/2004 |
| EP | 0 963 700 B1 | 4/2005 |
| GB | 2 055 846 A | 3/1981 |
| NL | 9101127 | 1/1993 |
| WO | WO 89/05098 | 6/1989 |
| WO | WO 91/17665 | 11/1991 |

(Continued)

OTHER PUBLICATIONS

Rynne, NM; Beresford, TP; Kelly, AL; Guinee, TP. Effect of milk pasteurization temperature and in situ whey protein denaturation on the composition, texture and heat-induced functionality of half-fat cheddar cheese. International Dairy Journal 14(2004) 989-1001.*

(Continued)

*Primary Examiner* — Humera Sheikh
*Assistant Examiner* — Subbalakshmi Prakash
(74) *Attorney, Agent, or Firm* — Knobbe, Martens, Olson & Bear LLP

(57) ABSTRACT

Processed cheese is prepared in a process where the ingredients include at least 0.5% non-denatured whey protein concentrate and at least 0.5% denatured whey protein concentrate. The method can be used to prepared processed cheese with improved melting characteristics.

13 Claims, 2 Drawing Sheets

FOREIGN PATENT DOCUMENTS

| WO | WO 93/07761 | 4/1993 |
|---|---|---|
| WO | WO 01/00527 A1 | 1/2001 |
| WO | WO 01/05247 A1 | 1/2001 |
| WO | WO 2005 002350 A1 | 1/2005 |
| WO | WO 2006 068505 A1 | 6/2006 |

OTHER PUBLICATIONS

International Search Report for PCT/NZ2007/000058 dated Jul. 3, 2007.

Written Opinion of the International Searching Authority for PCT/NZ2007/000058 dated Jun. 27, 2007.

International Preliminary Report on Patentability for PCT/NZ2007/000058 dated Jan. 31, 2008.

Dunkerley et al., "The effect of calcium and cysteine hydrochloride on the firmness of heat coagula formed from cheddar whey protein concentrates," The Australian Journal of Dairy Technology, Mar. 1984, pp. 44-47.

Gupta et al., "Firmness and melting quality of processed cheese foods with added whey protein concentrates," Lait, 1993, pp. 381-388, vol. 73.

McMahon et al., "Use of fat replacers in low fat mozzarella cheese," Journal of Dairy Science, 1911, 1 page, vol. 79, No. 11.

Savello et al., "Microstructure and meltability of model process cheese made with rennet and acid casein," J. Dairy Sci., 1989, pp. 1-11, vol. 72, No. 1.

A Joha Guide—Processed Cheese Manufacture, BK Ladenburg GmbH, 1989, 4 sheets, pp. 92-95.

Harper & Hall, Dairy Technology & Engineering, AVI Publishing Co. Inc., 1976, pp. 576-579.

Hettiarachchy & Ziegler, Protein Functionality in Food Systems, Marcel Decker, 1994, pp. 22-25.

Webb, Johnson & Alford, Fundamentals of Dairy Chemistry, AVI Publishing Co. Inc., 1974, pp. 620-623.

* cited by examiner

DAIRY PRODUCT AND PROCESS

REFERENCE TO RELATED APPLICATIONS

The present application is the U.S. National Phase of International Application PCT/NZ2007/000058, filed Mar. 23, 2007 and claims priority to New Zealand Patent Application Number NZ 546105, filed Mar. 23, 2006 and New Zealand Patent Application Number NZ 546530, filed Apr. 11, 2006. Each of the priority applications is hereby incorporated by reference in its entirety.

FIELD OF INVENTION

This invention relates to novel processed cheese products and a process of making same. More particularly, this invention relates to a processed cheese product having improved melting characteristics.

BACKGROUND

Processed cheese is a food product made from fresh or regular cheese and other unfermented dairy ingredients, plus emulsifiers, extra salt and food colourings. The unfermented dairy ingredients can include products like Simplesse, which is a whey protein product that is used as a substitute for fat in low-calorie foods.

The use of emulsifiers in processed cheese results in cheese that melts smoothly when cooked. Without such emulsifiers, processed cheese has a tendency to separate into a molten protein gel and liquid fat when heated. The emulsifiers (typically sodium phosphate, monopotassium phosphate, tartrate or citrate) reduce the tendency for fat globules in cheese to coalesce and pool on the surface of molten cheese. However, most processed cheese tends to "undermelt" and has a plastic-like appearance even when heated.

Any method of making processed cheese where the melt characteristics can be controlled is desirable. This would be beneficial to the cheese making industry, large consumers such as the pizza industry, as well as individual consumers, as processed cheese has many advantages over fresh of regular cheese, in particular it has an extended shelf life.

It is an object of the present invention to provide a process of making processes cheese having improved melt characteristics and/or at least to provide the public with a useful choice.

DISCLOSURE OF THE INVENTION

It has surprisingly been found that adding denatured whey protein to standard ingredients including non-denatured whey proteins in a process of making processed cheese results in a processed cheese having improved melt characteristics.

It is to this feature that the present invention is directed.

Accordingly in one embodiment the invention provides a process for producing a processed cheese comprising the steps:
(a) providing intact casein;
(b) optionally providing at least one emulsifier;
(c) providing at least 0.5% non-denatured whey protein concentrate;
(d) providing at least 0.5% denatured whey protein concentrate;
(e) blending and processing the ingredients of steps (a) to (d) and any further ingredients to form a processed cheese,
wherein the intact casein is obtained from cheese, preferably young cheese, skim milk cheese or rennet casein.

The processed cheese has improved melt characteristics relative to a processed cheese produced by a process without steps (c) and (d).

Preferably the processed cheese contains at least 10% fat. More preferably the processed cheese contains at least 15% fat.

A "young cheese" is a newly made or unripened cheese having a high level of intact protein as understood by a person skilled in the art of processed cheese making and can prepared from curds using known cheese making techniques but not allowed to mature or ripen for a significant period of time. Such cheeses in the context of this specification may also be described as "fresh or regular cheeses".

The term "denatured" refers to proteins that have lost functional and physical properties. Preferably denatured protein for use in the invention is highly denatured, for example by heating at over 80° C.

Generally, denatured whey proteins will display limited solubility in water, poor or no ability to form gels in a heated aqueous solution and poor or limited ability to act as an emulsifier or to form a stable foam. However the protein may be denatured by other means such as altering the pH and mineral environment.

A whey protein concentrate (WPC) is a fraction from whey from which the lactose has been at least partially removed to increase the protein content to at least 25%, preferably at least 30% (w/w) of total solids. For this invention it is preferred to use WPCs with over 50% of the total solids as whey proteins, preferably at least 65%, most preferably at least 75%. Preferably the proportions of the different whey proteins are substantially the same as in the whey from which the WPC was derived. Preferably the WPC is a whey protein retentate. The percentage protein in a whey protein concentrate is often appended at the end of WPC, for example WPC 55 is 55% whey proteins.

Processing of the ingredients to form the processed cheese generally involves blending the ingredients followed by cooking the mixture at a temperature of 65-140° C. for 10 seconds-30 minutes. At higher temperatures, shorter times are used. At lower temperatures, younger times are used. Other ingredients usually include water, fat, salts including emulsifying salts and sodium chloride and flavouring. Colourings are also often included.

In another embodiment the invention provides a process for controlling the melt characteristics of a processed cheese comprising:
(a) determining the desired melt characteristics of processed cheese;
(b) determining the optimum amount of denatured whey protein concentrate and non-denatured whey protein concentrate to be added to the processed cheese to achieve the desired melt characteristics;
(c) providing fresh or regular cheese;
(d) providing the optimum amount of denatured whey protein concentrate and non-denatured whey protein concentrate as determined in step (b);
(e) optionally providing additional GRAS ingredients;
(f) blending and processing the ingredients of (c) to (e) to form a processed cheese.

Preferably the processed cheese contains at least 10% fat. More preferably the processed cheese contains at least 15% fat.

In another embodiment the invention provides a processed cheese comprising:
(a) at least 15% fat, and
(b) at least 0.5% denatured whey protein,
(c) at least 0.5% non-denatured whey protein, wherein the processed cheese has improved melt characteristics relative to a processed cheese produced without use of denatured whey protein.

In all aspects of the invention, the processed cheese preferably comprises at least 20% fat and more preferably at least 25% fat.

Preferably in all aspects of the invention the processed cheese comprises at least 1% denatured whey protein and more preferably at least 2% denatured whey protein. Most preferably the processed cheese comprises at least 3% denatured whey protein. Preferably 20-95% of the total whey protein is denatured and more preferably 25-90%. Most preferably 30-80% of the total whey protein is denatured. Preferably the total whey protein concentrate comprises 1.0-10% of ingredients used in the method of making the processed cheese, preferably 2-8% more preferably 3-7%.

In certain preferred embodiments the denatured WPC has been heat-treated at greater than 50° C., at a pH of 6.0 to 8.5, preferably 6.6 to 8.5 and at a calcium ion content of 80-400 mmole/kg dry solids.

The use of addition of both denatured and non-denatured WPC allows improved control of the extent of denaturation of the whey proteins. This is not readily achieved by denaturing a single batch of WPC. Furthermore partial denaturation provides WPCs with different properties from mixtures of denatured and non-denatured WPCs.

Processed cheese is a food product made from fresh or regular cheese and other unfermented dairy ingredients, plus emulsifiers, extra salt and food colourings. It is typically bland in nature and can be described as a "plastic" cheese. It melts very little on heating due to the presence of the emulsifying salts which prevent the fat globules from separating from the protein. Consequently, processed cheese has not been used extensively in applications where good cheese melt is required, such as, for example, in the pizza industry. However, as processed cheese has exceptionally good shelf life compared to fresh or regular cheese a processed cheese with good melt characteristics would be very beneficial to the pizza industry, for example.

It has surprisingly been found that the additional of whey protein, where the whey protein comprises 20-95% denatured whey protein, significantly improves the melt characteristics of processed cheese.

Gupta, V. K., and Reuter H. (1993) show that addition of native whey decreases the meltability of processed cheese.

Savello, P. A. and Ernstrom, C. A. (1989) show that both native and denatured whey protein decrease the melt properties of process cheese.

Berger, W., Klostermeyer, H., Merkenich, K., and Uhlmann, G. (1993) describe the use of heat denaturation of whey protein added to block process cheeses to produce processed cheese products which retain a stable shape when reheated. In other words, the products do not melt.

However none of these documents describe processes for producing processed cheese with increased melt properties. Such properties are desirable in many instances, including the fast food industry where processed cheese is widely used.

The term "comprising" as used in this specification means 'consisting at least in part of', that is to say when interpreting statements in this specification which include that term, the features, prefaced by that term in each statement, all need to be present but other features can also be present.

The invention consists in the foregoing and also envisages constructions of which the following gives examples only.

EXAMPLES

Example 1

Figure 1:
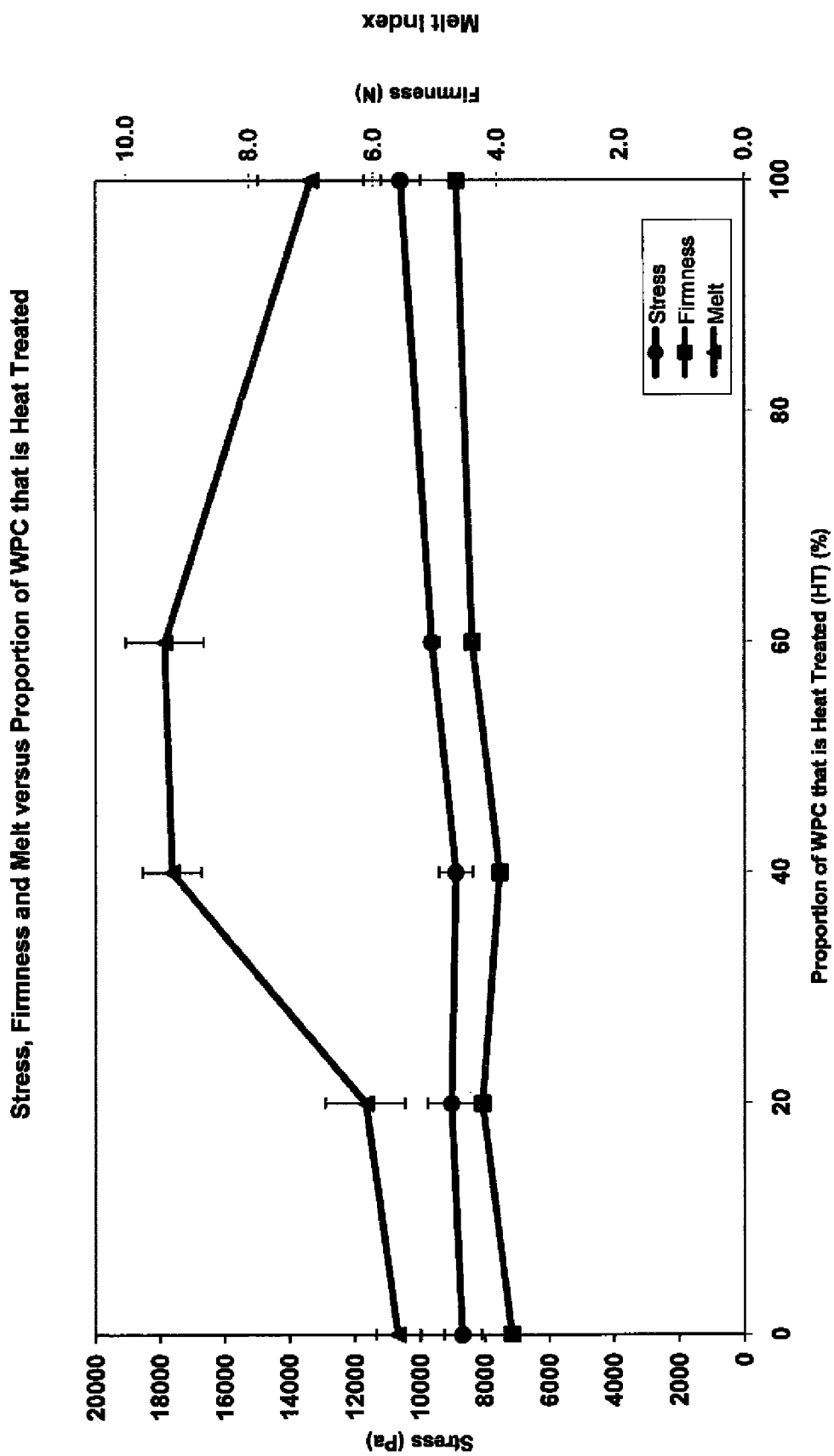
FIG. 1 shows a graph of variation of stress (●), firmness (■) and melt (Δ) characteristics with proportion of WPC that is heat-treated.
Figure 2:
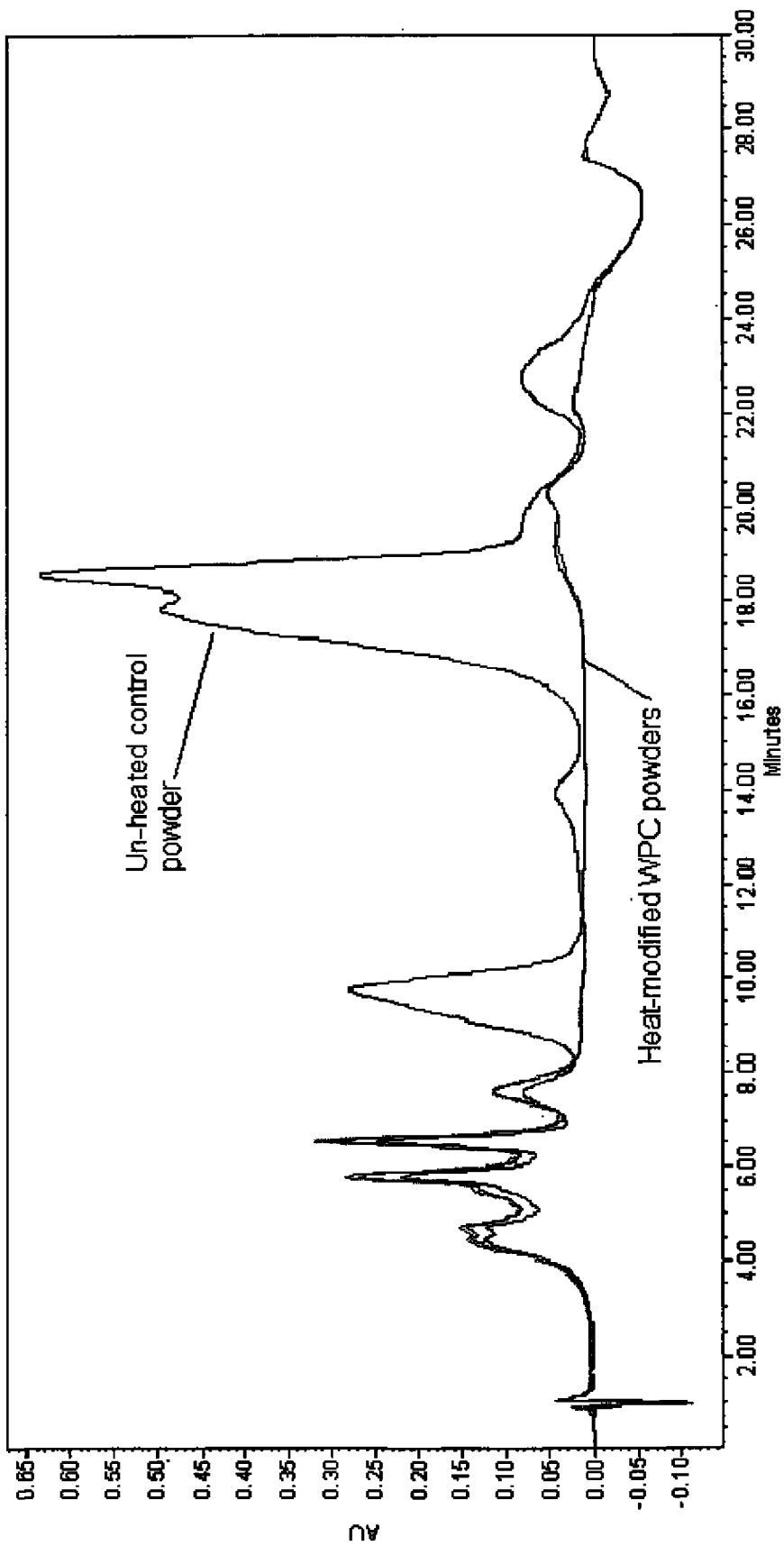
FIG. 2 shows SEC profiles of 1% WPC solutions prepared from un-heated control standard cheese WPC (A392) and heat-modified WPC powders.

Evaluation of Different Ratios of Denatured to Native Whey Proteins

Processed cheese pre-mix samples containing different ratios of denatured to native whey proteins were prepared. A hybrid cheese-rennet casein formulation was used.

The formulation in Table 1 below is for the "20%" case.

TABLE 1

Processed cheese pre-mix sample containing 20% of total whey protein as denatured whey protein.

| Ingredient | Quantity (g) | % |
|---|---|---|
| Rennet Casein | 3.34 | 11.133 |
| Added water | 10.780 | 35.933 |
| Trisodium citrate | 0.720 | 2.400 |
| Vacuum salt bulk | 0.330 | 1.100 |
| Hi solids cheddar | 5.970 | 19.900 |
| Salted butter | 6.830 | 22.767 |
| Native WPC* | 1.060 | 3.533 |
| HT WPC* | 0.260 | 0.867 |
| Lactose | 0.470 | 1.567 |
| Citric acid | 0.210 | 0.700 |
| Potassium sorbate | 0.030 | 0.100 |

*WPC means undenatured whey protein concentrate [ALACEN 392, Fonterra Co-operative Group Limited, Auckland containing 80% protein on a dry basis. HT WPC means heat treated whey protein concentrate (denatured whey protein). HT WPC powder was prepared by the following method. WPC solution (17%, w/w) was prepared from standard commercial cheese WPC80 powder, by reconstituting an appropriate amount of powder in miliQ water. The final solution had a pH of 6.8. The solution was neutralised using 2% Ca(OH)$_2$ solution. The final pH was 7.45. The solution was then heated by direct steam injection (DSI) to 90° C. for 7 min. This was achieved by circulating the heated solution in a holding tube. The solution was then cooled to about 60° C., via tubular heat exchanger, homogenised (100 bar), and then spray dried. The powder was then characterised and applied in process cheese application.

The denaturation level of the WPC component was varied for the other samples by altering the ratio of native whey protein to denatured whey protein. Table 2 lists the ratios that were used.

TABLE 2

Amount of native whey protein concentrate and denatured whey protein concentrate to achieve desired ratios.

| Proportion of HT WPC | Native WPC (g) | HT WPC (g) |
|---|---|---|
| 0 | 1.320 | 0.000 |
| 20 | 1.060 | 0.260 |
| 40 | 0.790 | 0.530 |
| 60 | 0.530 | 0.790 |
| 100 | 0.000 | 1.310 |

The cheese was a high solids cheese stored frozen post manufacture until used.

An RVA-4 (rapid visco analyser) was used to make the processed cheese (10 minute cook, maximum speed 800 rpm and maximum temperature 85° C. The molten cheese was cast into ~2 mm slices and stored in a 4° C. refrigerator in plastic bags for 3 days before texture and melt testing. Stress and strain were measured using the Vane test (Brookfield), firmness was measured using the Cylinder test (TA-XT2) and melt was assessed using a modified melt method of Kosikowski and Mistry (1997) (170° C. for 10 minutes).

The leftovers from testing were used to check pH and moisture. pH was measured by glass electrode and an oven method (105° C. for 16 hours) was used to measure moisture levels.

The moisture and pH data is provided in Table 3. The texture and melt data is provided in Table 4.

TABLE 3

Moisture and pH levels of samples.

| Proportion of HT WPC | Moisture (%) | pH |
|---|---|---|
| 0 | 47.1 | 5.60 |
| 20 | 47.2 | 5.62 |
| 40 | 47.3 | 5.63 |
| 60 | 47.2 | 5.63 |
| 100 | 47.3 | 5.66 |

TABLE 4

Texture and melt data

| Proportion of HT WPC (%) | Stress (Pa) | | Strain | | Firmness (N) | | Melt Index | |
|---|---|---|---|---|---|---|---|---|
| | Mean | SD | Mean | SD | Mean | SD | Mean | SD |
| 0 | 8681 | 584 | 0.900 | 0.096 | 383 | 13 | 5.6 | 0.4 |
| 20 | 9034 | 731 | 0.895 | 0.085 | 432 | 5 | 6.1 | 0.6 |
| 40 | 8892 | 530 | 0.921 | 0.040 | 404 | 11 | 9.3 | 0.5 |
| 60 | 9628 | 215 | 0.924 | 0.030 | 449 | 12 | 9.4 | 0.6 |
| 100 | 10583 | 602 | 0.917 | 0.055 | 475 | 8 | 7.0 | 0.8 |

The data from Table 4 is summarised in FIG. 1.

SUMMARY

FIG. 1 showed that the firmness (and stress, another measure of firmness) of the slices made with different proportion of native to denatured whey proteins increased with increased denatured whey proteins.

The melt index of the samples was most interesting: increasing melt index with increased HT WPC (denatured whey protein level), but at 100% HT WPC, the melt index decreased again.

Example 2

Evaluation of Different Whey Protein Concentrates

Samples were prepared using the same method as Example 1, with the formulation adapted so that different samples contained different whey protein concentrates. Table 5 shows the different whey protein concentrates that were used.

TABLE 5

Whey Protein Concentrates Used

| Sample | Whey protein concentrate |
|---|---|
| Control | No added whey protein |
| A | ALACEN 392 (Fonterra Co-operative Group Limited, Auckland) Commercially available native whey protein |
| B | ALACEN 893 (Fonterra Co-operative Group Limited, Auckland) Commercially available denatured whey protein |
| C | Denatured whey protein concentrate (sample 26226 below). |
| D | Simplesse100 (CP Kelco, Atlanta, USA). Commercially available denatured whey protein concentrate |
| E | The whey protein concentrate of PCT/NZ2005/000343. |

A general description of the composition of the final slice is as follows:

Moisture: 47.25%
Protein 18.3%
  Whey protein 3.6% (% whey protein to total protein level=19.7%)
Fat 26%
Lactose 2.2%
pH of 5.6 (±0.05).

Stress and strain, firmness and melt were evaluated as in Example 1. Table 6 shows the firmness results.

TABLE 6

Results of sample firmness and melt scores

| Sample | Control | ALACEN 392 | ALACEN 893 | Simplesse 100 | Sample 26226 | Sample E |
|---|---|---|---|---|---|---|
| Firmness (N) | 11.7 | 8.7 | 9.1 | 10.9 | 9.8 | 8.8 |
| Melt score | 6.1 | 3.7 | 8.4 | 8.1 | 7.8 | 5.4 |

Table 6 shows that Sample A (native whey proteins) had the lowest firmness. All the slices that contain denatured WPCs had slightly lower firmness than the control sample.

Table 6 shows the melt data results.

Table 6 illustrates how melt properties can be increased by the addition of 100% denatured whey protein. The effect is seen irrespective of method of denaturation.

Table 6 also shows that the addition of native whey protein (Sample A) results in a decrease in melt properties.

Table 6 also shows that intermediate levels of denaturation (Sample E) show an intermediate affect on meltability.

The conclusion is that by blending denatured and non denatured whey proteins one can customise the melting characteristics of a processed cheese.

Conclusion

Table 6 showed that the samples containing 100% denatured whey protein had improved melting characteristics when compared to the control. Sample E with an intermediate level of denaturation had approximately similar melt to the control while Sample A (native whey protein) had a lower melt, and the lowest melt of all the slices.

Without wanting to be bound by theory, it is thought that the native whey proteins denature during the cooking process and form a gel structure (with casein) strong enough to resist melting. Alternatively, whey protein aggregates may have been formed in sufficient quantity to disrupt the structure. This would explain the low firmness seen with this example. It is also possible that the whey proteins could have denatured during the process and soaked up some of the water during the denaturing process and "dehydrated" the protein phase as a result.

Example 3

Model Processed Cheese Slices

Four sample batches of denatured WPC were used, designated as follows:
1. sample 26226
2. sample 22885
3. sample 24368
4. spray dried lactalbumin ALACEN 893 (Fonterra Co-operative Group Limited, Auckland, New Zealand)

Preparation of Sample 26226

Cheese whey retentate (80% protein) at 8% total solids and a pH of 6.5 was neutralised to pH 7.0 using 2% solution of slaked lime [$Ca(OH)_2$]. The neutral solution was heated to 120° C. by direct steam injection and held at temperature for 240 s. Then the heat treated mixture was cooled to about 60° C. by passing through a heat exchanger. The cooled mixture was 2-stage homogenised using pressures of approximately 250 bar and 60 bar. The slurry was concentrated using a falling film evaporator to approx. 30% solids and spray dried to a powder with a moisture content of about 4.5%.

Preparation of Sample 22885

The above method for 26226 was used except for: 10% NaOH was used to neutralise the retentate to pH 6.9, whereupon $CaCl_2$ (as 2% solution in water) was added at the rate of 2 g Ca/kg protein.

Preparation of Sample 24368

The above method for 26226 was used except for: The initial solution of whey protein had a concentration of 6% solids. 10% NaOH was used to neutralise the retentate to pH 7.0, whereupon Ca citrate (as 5% solution in water) was added at the rate of 2.3 g Ca citrate/liter of 6% retentate.

The determination of the degree of protein denaturation was carried out using size exclusion chromatography (SEC) method described by Havea, P., Singh, H., and Creamer, L. K. Heat-induced aggregation of whey proteins: Comparison of cheese WPC with Acid WPC and relevance of mineral composition. *Journal of Agricultural and Food Chemistry*, 2002, 50, 4674-4681. The SEC elusion profile of the 1% WPC solution prepared from heat-modified WPC powders were compared with that of 1% WPC solution prepared from control un-heated standard cheese WPC powder (A392). The differences between the peak areas of each protein in these samples were used to calculate the level of protein denaturation in each powder. An example of the HPLC profiles of the unheated WPC and heat-modified powders is depicted in FIG. 4. Samples 26226, 22885 and 24368 all had protein denaturation levels of about 95%.

The composition of the denatured WPC proteinates is given in table 7.

TABLE 7

Composition of proteinates

| % w/w | ALACEN 392 | 26226 | 22885 | 24368 | ALACEN 893 |
|---|---|---|---|---|---|
| Protein | 80.45 | 81.1 | 75.6 | 78.67 | 88.62 |
| Moisture | 4.56 | 3.76 | 4.21 | 4.1 | 4.59 |
| Fat | 5.86 | 5.22 | 7.46 | 5.72 | 2.46 |
| Ash | 2.75 | 2.36 | 3.31 | 4.21 | 3.92 |
| Lactose | 6.55 | 6.37 | 6.12 | 3.69 | 0.41 |
| Ca mg/kg | 3200 | 3651 | 5000 | 9920 | 981 |
| Mg mg/kg | 460 | 520 | 413 | 416 | 57 |
| K mg/kg | 4460 | 3987 | 3390 | 3110 | 362 |
| Na mg/kg | 3720 | 3888 | 5500 | 4820 | 7180 |

Method:

The model processed cheeses were prepared using an RVA mixture cooker (Newport Scientific, Warriewood, NSW, Australia). The recipe is as detailed in the table below. Five levels of WPC and denatured WPC substitution were carried out (0:100, 30:70, 60:40, 70:30, 100:0 [proportion % denatured WPC: % native WPC]).

4.624 g of rennet casein (ALAREN 799, 90 mesh, Fonterra Co-operative Group Limited, Auckland, New Zealand) was hydrated in with 0.67 g ti-sodium citrate (Jungbunzlauer GmbH, Perhofen, Austria), 0.541 g sodium chloride (Pacific salt, Christchurch, New Zealand) and 14.68 g water and native whey protein concentrate [80% protein prepared from cheese whey] ALACEN 392 (Fonterra, Auckland, New Zealand) in the aluminium cup for 40 min. 0.26 g citric acid (Jungbunzlauer GmbH, Perhofen, Austria), 0.53 g lactose (Fonterra Co-operative Group Limited, New Zealand), 0.017 g potassium sorbate and the denatured WPCs were added to the hydrated mixture and stirred. 7.7 g melted AMF (anhydrous milk fat, Fonterra Co-operative Group Limited, Auckland, New Zealand) was then added and stirred to form a coarse emulsion. (0.2 g of the added water was assumed to evaporate during the cooking process.) The mixture was cooked using the following programme:

| Time (min) | Temp (° C.) | Speed (rpm) |
|---|---|---|
| 0 (Start) | 25 | 0 |
| 0.5 | 25 | 100 |
| 2 | 25 | 200 |
| 3 | 25 | 400 |
| 4 | 85 | 800 |
| 10 (End) | 85 | 800 |

TABLE 8

Composition table for WPC mixtures

| Run No. | | 0:100 | 30:70 | 60:40 | 70:30 | 100:0 |
|---|---|---|---|---|---|---|
| 1 | WPC (ALACEN | 1.175 | 0.823 | 0.470 | 0.353 | 0 |
| 2 | 392) [g] | 1.175 | 0.823 | 0.475 | 0.356 | 0 |
| 3 | | 1.175 | 0.823 | 0.474 | 0.355 | 0 |
| 4 | | 1.175 | 0.801 | 0.457 | 0.343 | 0 |
| 1 | WPC 26226 [g] | 0 | 0.352 | 0.705 | 0.823 | 1.175 |
| 2 | WPC 22885 [g] | 0 | 0.366 | 0.714 | 0.833 | 1.189 |
| 3 | WPC 24368 [g] | 0 | 0.361 | 0.71 | 0.829 | 1.184 |
| 4 | ALACEN 893 | 0 | 0.343 | 0.687 | 0.801 | 1.144 |

At the end of 10 min cook time, the molten processed cheese was poured onto a plastic sheet. Another plastic sheet was placed immediately over the molten processed cheese. A rolling pin was applied over the top plastic sheet and rolled over the still molten processed cheese into a thin slice approximately 2.5 mm thick. This slice was sealed in a plastic bag and then transferred immediately onto to a cold aluminium flat plate in a refrigerator. After 1 week, the samples were analysed for texture and melt.

Schreiber Melt Test

The melt was determined using a modified Schreiber melt test. Details of the Schreiber melt test may be found in U.S. Pat. No. 5,750,177 which is incorporated herein by reference in its entirety. The oven temperature was 170° C. and the film of cheese was 4.5-5 mm thick (2 layers of the above slices). Samples were placed in the oven and heated for 10 minutes.

Texture Analysis

Texture was measured by the force [in Newtons] required to drive a 6 mm diameter cylinder probe at constant speed into a stack of 4 sheets of cheese (each approx. 2.5 mm thick)

using a texture analyzer TA-XT2 (Stable Micro Systems, Ltd in Godalming, Surrey UK) with the following instrument settings:
Pre speed 11.0 mm/s,
Test speed 1.0 mm/s,
Post speed 1.0 mm/s,
Rupture test distance 1.00 mm,
Distance 10.0 mm,
Force 0.1N
Count 5,
Time 5.0 s
Load cell 50 kg
Temperature 13° C.,
Trigger: auto.

TABLE 9

Texture and melt results

| Blend ratio | 26226 | | 22885 | | 24368 | | ALACEN 893 | |
|---|---|---|---|---|---|---|---|---|
| denatured WPC:native WPC | Firmness (N) | Schreiber Melt | Firmness (N) | Schreiber Melt | Firmness (N) | Schreiber Melt | Firmness (N) | Schreiber Melt |
| 0:100 | 2.6 | 6.1 | 2.6 | 6.1 | 2.6 | 6.1 | 2.6 | 6.1 |
| 30:70 | 2.5 | 5.8 | 2.9 | 7.8 | 2.7 | 7.0 | 3.2 | 6.3 |
| 60:40 | 2.7 | 11.7 | 3.0 | 9.3 | 3.2 | 8.2 | 4.3 | 8.7 |
| 70:30 | 2.9 | 11.3 | 3.2 | 8.0 | 3.5 | 9.4 | 4.7 | 7.7 |
| 100:0 | 3.1 | 11.2 | 3.8 | 8.1 | 3.7 | 9.0 | 4.3 | 8.2 |

The table of texture and melt results revealed that a combination of both native and denatured whey protein gave a maximum in firmness and melt score. Generally, the maximum occurred between 40% and 90% denatured WPC.

INDUSTRIAL APPLICATION

The present invention has utility in providing a processed cheese with improved melt characteristics. The described compositions and methods of the invention may be employed in the pizza industry or in other industries that use processed cheese.

REFERENCES

Berger, W., Klostermeyer, H., Merkenich, K., and Uhlmann, G. (1993) *Processed Cheese Manufacture*—A JOHA Guide p 93

Gupta, V. K., and Reuter H. (1993) *Firmness and melting quality of processed cheese foods with added whey protein concentrates* Lait 73: 381-388

Kosikowski, F. V. and Mistry, V. V. (1997) Cheese and Fermented Milk Foods, 3$^{rd}$ Edition, p 259. L.L.C. Connecticut Savello, P. A. and Ernstrom, C. A. (1989) *Microstructure and meltability of model process cheese made with rennet and acid casein* Journal of Dairy Science 72: 1-11

Those persons skilled in the art will understand that the above description is provided by way of illustration only and that the invention is not limited thereto. There are numerous variations and modification that may be used. For example the protein content of the WPCs may be varied. The composition of the processed cheese may be varied and heat treatments may be varied.

The invention claimed is:

1. A method for producing a processed cheese or a processed cheese-like product comprising the steps:
   (a) providing a source of intact casein;
   (b) separately providing non-denatured whey protein concentrate;
   (c) separately providing denatured whey protein concentrate;
   (d) blending and processing the ingredients of steps (a) to (c) and any further ingredient to form a processed cheese,
   wherein the intact casein is obtained from cheese, young cheese, skim milk cheese or rennet casein, and wherein the ingredients comprise at least 0.5% of the non-denatured whey protein concentrate and at least 0.5% of the denatured whey protein concentrate.

2. A method as claimed in claim 1 wherein the processed cheese contains at least 10% fat.

3. A method as claimed in claim 1 wherein the processed cheese contains at least 15% fat.

4. A method as claimed in claim 3 wherein the processed cheese comprises at least 25% fat.

5. A method as claimed in claim 1 wherein the level of denaturation of the denatured whey protein is at least 50% as determined by the method of size exclusion Chromatography.

6. A method as claimed in claim 1 wherein the ingredients of the processed cheese comprise at least 1% denatured whey protein.

7. A method as claimed in claim 1 wherein the ingredients of the processed cheese comprise at least 3% denatured whey protein.

8. A method as claimed in claim 1 wherein 20-95% of the total whey protein is denatured.

9. A method as claimed in claim 1 wherein 25-90% of the total whey protein is denatured.

10. A method as claimed in claim 1 wherein 30-80% of the total whey protein is denatured.

11. A method for controlling the melt characteristics of a processed cheese comprising:
   (a) determining the desired melt characteristics of processed cheese;
   (b) determining the optimum amount of denatured whey protein concentrate and non-denatured whey protein concentrate to be added to the processed cheese to achieve the desired melt characteristics;
   (c) providing fresh or regular cheese;
   (d) providing the optimum amount of denatured whey protein concentrate and non-denatured whey protein concentrate as determined in step (b);
   (e) blending and processing the ingredients of (c) and (d) to form a processed cheese.

12. A method as claimed in claim 11 wherein the processed cheese contains at least 10% fat.

13. A method as claimed in claim 11 wherein the processed cheese contains at least 15% fat.

* * * * *